United States Patent [19]

Rouverol

[11] 4,108,017

[45] Aug. 22, 1978

[54] STANDARD-PITCH GEARING

[76] Inventor: William Spence Rouverol, P.O. Box 9122, Berkeley, Calif. 94709

[21] Appl. No.: 778,260

[22] Filed: Mar. 16, 1977

[51] Int. Cl.² ............................................. F16H 55/06
[52] U.S. Cl. ...................................................... 74/462
[58] Field of Search ............................ 74/462, 460, 457

[56] References Cited

U.S. PATENT DOCUMENTS

| | | | |
|---|---|---|---|
| 3,937,098 | 2/1976 | Rouverol | 74/462 |
| 4,051,492 | 9/1977 | Laskin et al. | 74/462 X |

*Primary Examiner*—Leonard Hall Gerin

*Attorney, Agent, or Firm*—Gordon Wood

[57] ABSTRACT

Involute gearing can be optimized with respect to torque capacity only if the number of pinion teeth is standardized in a fairly narrow range, between about 15 and 40 teeth, depending on the tooth materials, pressure angle and gear ratio. The present invention discloses an alternative system of gearing that standardizes pitch instead of tooth numbers, so that pinions with several hundred teeth can be designed without sacrifice of any torque capacity relative to that of coarse-tooth involute gearing. The use of finer teeth reduces friction, heating and wear, but in particular helps to minimize operating noise.

31 Claims, 1 Drawing Figure

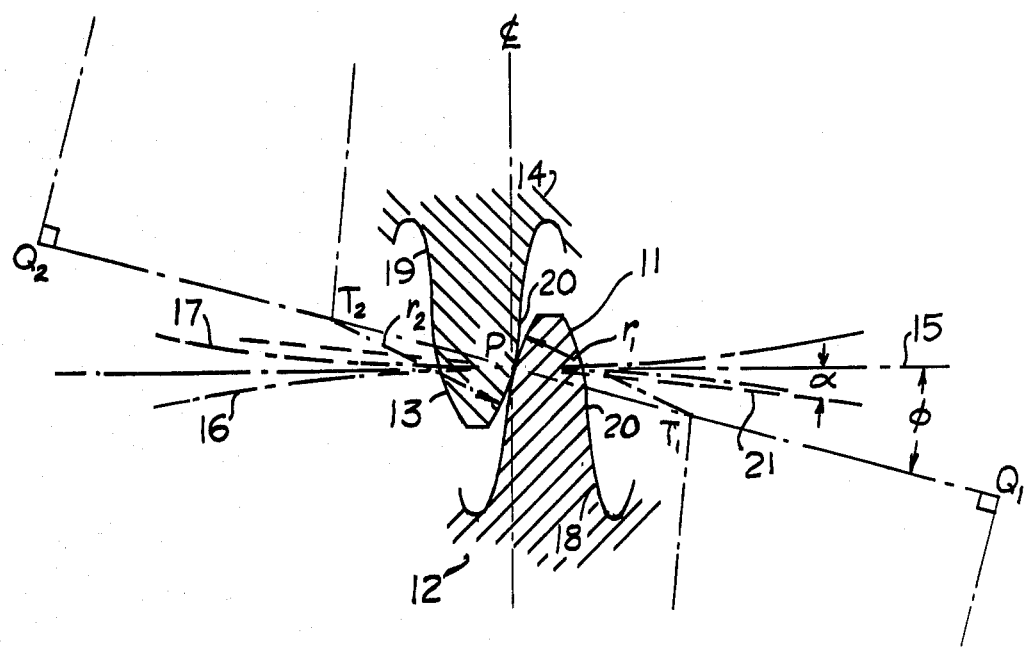

STANDARD-PITCH GEARING

This is a continuation-in-part of application Ser. No. 746,706, filed Dec. 2, 1976, now abandoned.

Involute gearing is essentially a standard tooth-number system of gearing. That is to say, if the tooth profiles of a set of gears are of the involute form, there is a certain number of teeth on the pinion that will give the set the maximum torque capacity, and if the pinion has any other number of teeth, the torque capacity will be less than optimum. This particular number of teeth, which may be found by simultaneous solution of the equations for surface stress and root stress, is called in this specification the "critical number of teeth" ($n_{cr}$). For hardened steel or plastics, $n_{cr}$ is in the range 15 to 25, depending on pressure angle and gear ratio; for unhardened steel or cast iron the range is usually 25 to 40, or at most 50.

The reason conventional involute gearing has a "critical number of teeth" is evident from FIG. 7 of U.S. Pat. No. 3,881,364: Torque capacity plotted as a function of the number of teeth on the pinion gives a curve of diminishing ordinate in the case of tooth bending strength and a curve of increasing ordinate in the case of tooth surface strength. These two curves intersect to produce a two-part curve that defines the torque capacity for various pinion tooth numbers $n_1$. Since the two curve parts meet at a cusp, capacity falls off rapidly for values of $n_1$ lower or higher than $n_{cr}$, and for values of $n_1$ several times as large as $n_{cr}$, will be only a fraction of the maximum torque capacity at $n_{cr}$. This is because the Lewis equation, which is used to calculate the bending strength of all involute gearing, includes the tooth module in the numerator.

The object of the invention is therefore to provide a system of gearing that will not require the tooth size to be increased as the gear size increases. Since the pinion of gear sets embodying the invention can have as many teeth as desired without sacrifice of torque capacity, then tooth pitch can be standardized instead of tooth number, and the great advantages of fine teeth (lower operating noise and reduced friction, heating and wear) can be made available for gears of all sizes.

The means to achieve this and other objects and advantages of the invention will be evident from the drawing as explained in the specification that follows.

The drawing is an enlarged partial section of a pair of mating gears taken perpendicularly to the common pitch element and showing mating profiles embodying the invention.

In detail and referring to the drawing, typical teeth 11, 13 embodying the invention are shown in transverse section engaged at pitch point P. Tooth 11 is on the smaller gear 12 (pinion) and has a working profile of circular arc form, the radius of the arc being $r_1$ and the arc center being at $T_1$. Similarly, tooth 13 is on the larger gear 14 and has a circular arc working profile of radius $r_2$ centered at $T_2$. The line $Q_1Q_2$ is the pressure line making an angle $\phi$, called the transverse pressure angle, with a line 15 tangent to the pitch circles 16, 17 of the mating gears 12, 14. The points $Q_1$ and $Q_2$ are the points where the pressure line $Q_1Q_2$ is tangent to the base circles (not shown) from which involute profiles would have been generated. (Other parts of the two gears 12 and 14, such as hubs, webs, rims, keyways, etc., are standard and are omitted in the interest of clarity.)

One of the distinguishing features of the gearing herein disclosed is that the radius of relative curvature $r$ of the tooth profiles, which is expressed by the formula $$r = \frac{1}{\frac{1}{r_1} + \frac{1}{r_2}} \qquad (1)$$

is substantially smaller than that of involute gearing. In involute gearing the radius of relative curvature of the teeth in the transverse plane will be found to be equal to:

$$r_i = R_1 \left( \frac{G}{1+G} \right) \sin \phi \qquad (2)$$

where $R_1$ is the pitch circle radius of the pinion, G is the ratio of the pitch circle radii of the gear and pinion, and $\phi$ is the pressure angle in the transverse plane. The radius of relative curvature $r$ at the pitch point for gearing embodying the invention is nearly always less than 80% of the value of $r_i$ given by Equation 2, and in most gearing falls into the range between 20% and 60% of $r_i$. On the other hand, the radius $r$ will always be greater than about 1.1 tooth modules and in most cases greater than 1.25 tooth modules.

This reduced radius of curvature relative to that of involute profiles means that the gearing disclosed herein is not geometrically conjugate in the transverse plane. The gearing will therefore run most smoothly if the teeth are helical (or in the case of bevel gearing, spiral bevel). However, this "standard-pitch gearing" has a transverse (or "profile") contact ratio that when the gears are loaded is always larger than two and sometimes as large as six or seven, so spur or straight bevel teeth are quite feasible, particularly when the number of teeth on the pinion is very large or the gear is internal.

According to the drawing, the form of the working portion of the tooth profile is a circular arc in the transverse plane. However, since the teeth are quite fine, many curves that approximate a circular arc over a short segment are usable, including a segment of an ellipse such as is obtained in the transverse plane if the tooth profiles are circular arcs in the normal plane.

In addition to this reduced tooth profile radius of curvature, the teeth of gears embodying the invention have a second distinguishing characteristic: They are much taller than conventional teeth. Whereas standard 20°-involute teeth for power transmission gearing have whole depths of 2.4 to 2.6 tooth modules, those of the teeth embodying the invention range from at least two and six-tenths to values as high as 6 or more. While this exceptional tooth depth has the advantage of increasing tooth flexibility and thereby making the gears less susceptible to the deleterious effects of machining errors and misalignment, the main reason for the increased tooth depth is quite different: It is known (U.S. Pat. No. 3,824,373) that when gear teeth having a radius of relative curvature shorter than that of involute gears are lightly loaded, they make contact at a single point called a "culmination point" (U.S. Pat. No. 3,937,098), but are separated by an amount that increases as the square of the distance from the culmination point at other positions in their meshing cycle. In gearing with relatively shallow teeth, nearly all of this separation is taken up by Hertzian deformation at the pitch point. However, if the pinion has a large number of teeth, a very short radius of relative curvature is needed in order to control the bending stresses. But values for the radius of relative curvature that are about half those of involute gears produce elliptical contact areas having an eccentricity that is not appreciably effected by small changes in the tooth profile radii.

The purpose of the increased depth of the teeth is therefore to give the designer an additional parameter than can be used to offset the effects of the shortened radii in producing excessive lengthwise curvature of the teeth, so that any number of teeth may be specified for the pinion and it will still be possible to make the elliptical contact areas exactly fill the tooth working surface at a torque load that produces the maximum allowable stress at both the tooth root and the tooth contact surface. How much extra depth the teeth must be given depends on the tooth module, tooth profile radii, addendum heights, the moduli of elasticity and the pressure angle. Using these parameters in standard design and deformation analyses, however, allows calculation of the particular dedendum depth that is required. In all cases this depth will be found to be more than 1.6 tooth modules, or more generally, since the dedendum depths on the two gears may not be the same, the sum of the dedendum depths for the two gears will be more than 3.2 tooth modules. This means that at least one of the mating teeth will have a whole depth of more than two and six-tenths tooth modules.

In order to insure that these exceptionally tall teeth have the lowest possible bending stresses at their roots in spite of their slender outline, the tooth flank thickness is increased continuously from the pitch circle all the way to the bottom of the tooth root. These elongated flanks, for which profiles comprising parabolic or related exponential curves are well-suited, do not carry any portion of the contact ellipses at any point in the meshing cycle, being utilized only to increase the tooth bending deflection. The teeth of the external gears embodying the invention will thus have a working profile portion that is convex and an elongated flank portion that is usually concave and separated from the working profile portion by a point of inflection 20.

It will be noted in the drawing that the line of action 21 makes a much smaller angle $\alpha$ with the common tangent line 15 than the pressure angle $\phi$ does. This is because the line of action is generated by a point between arc centers $T_1$ and $T_2$ that is caused by the shortened radii $r_1$ and $r_2$ to move at a flatter angle $\alpha$ than the pressure angle $\phi$. This leads to a large profile contact ratio, because the line 21 intersects the addendum circles (not shown) at points much further out from the pitch point P than those of an involute gear of pressure angle $\phi$. It also means that only tooth profile portions lying beyond the line 21 can receive load, so the actual working profile is usually less than half the tooth whole depth, especially in the case of the pinion 12.

The exceptional depth of the dedenda also means that the teeth embodying the invention will nearly always have more clearance at the root than the value of 0.4 tooth modules that is most commonly specified in standard 20°-involute gearing.

Although the type of gear tooth herein disclosed can be made with a wide variety of pressure angles, smaller pressure angles, not more than 20° and preferably less than 15°, minimize operating noise, prevent the teeth from becoming pointed at the tips if an extended addendum is used, and give a slightly higher torque capacity.

The third distinguishing characteristic of the gearing herein disclosed is that the pinion has an exceptionally large number of teeth. Or expressed in terms of gear geometry that also applies to sectors of gears, the "tooth pitch angle" is exceptionally small. (The term "pitch angle" as used in this specification means the angle in the transverse plane subtended at the pinion central axis by corresponding points on adjacent teeth; for a full pinion it will therefore be 360° divided by the number of teeth.)

The largest pitch angle that is practical in conjunction with the deepened dedendum is about 10°, which puts 36 teeth on a full pinion. This value would be for hardened steel or plastic gearing, and the maximum recommended pitch angle for gears of unhardened steel is close to 6° or 8°. This means that for small gears the teeth may be so fine that tolerances on center-distance and pitch line runout may become difficult or impossible to meet. Accordingly, the main area of application of "standard pitch gearing" is in gear sets where the pinion diameter is greater than about 15 millimeters, so that the number of teeth is in excess of the critical number of teeth for involute gearing of the same size, gear ratio and materials. Since the torque capacity does not decrease with tooth module as the gears become larger, it becomes feasible to standardize on a few modules that are fine enough to minimize noise, as well as friction, heating and wear, but coarse enough so that gears do not need to be down-rated to take account of errors in center-distances that result from standard machining and mounting techniques, that is to say, the anticipated manufacturing errors will not produce a significant reduction in the interengagement depth of the teeth. Standard tooth modules that meet both these requirements are in the range of 0.4 to 0.8 for vehicular and industrial gearing, and in the range of 0.8 to 1.3 for large marine gearing. As these ranges are quite narrow, standardization on a single module in each range is quite feasible.

It will be noted that these values are from 3 to 20 times finer than the modules that would ordinarily be specified for involute teeth for such applications. As indicated, however, the use of these finer teeth does not reduce torque capacity, because the full load profile contact ratio increases as rapidly as the module decreases. In fact, if the addendum height is made greater than the conventional value of one tooth module, which is quite possible because of the extra dedendum depth, the torque capacity may be slightly larger than that of a conventional involute gear set of the same size and materials.

A number of conventional modifications widely used with involute gears may also be applied to gearing of the type herein disclosed. For example, the pinion and gear may be given unequal addenda by hob retraction or in-feed. In the case of involute gearing, hob retraction is usually employed to prevent undercutting and tooth interference when the number of teeth on the pinion is small. In the case of "standard pitch" gearing, however, the purpose would be to increase the relative amount of recess action and to position the culmination point at the center of the line of action in large-ratio gear sets. As in the case of involute gearing, profile-retraction or in-feed, which are also called negative or positive profile shift respectively, leads to differences in pinion and gear tooth thickness at the pitch circle. In the case of "standard pitch" gearing it also produces a slightly different pressure angle at the pitch circles.

As in the case of involute gears, the teeth may be crowned slightly in the lengthwise direction, either by grinding or by in-feeding of the hob at the tooth ends. Because of the small size of the teeth, however, and their relative slenderness in the normal plane, a large amount of crowning is not feasible. This is not necessarily a disadvantage, however, since the teeth are so flexible that crowning will seldom be needed, and any additional relief considered necessary for alleviating tooth root bending stresses at the tooth ends can be provided more practically and economically by chamfering the ends of the teeth down to the pitch surface at about 45°. Alternatively, the tooth ends at opposite faces of a set of gears may be chamfered down to the point of inflection of the profile curve which marks the end of the working portion, using a chamfer angle that gives an effective face width of an integral number of axial pitch lengths at the culmination surface.

Although the drawing shows the pinion and gear teeth 11, 13 as being similar in shape, it is possible to make one profile quite short and to provide the necessary flexibility by making the whole depth of the other tooth even greater than indicated in the figure. This would alter the thickness of the teeth at the tooth roots but would have very little effect on the sum of the whole depths of the mating teeth needed to provide the required bending deflection at full load. The sum of the whole depths for the mating teeth would still need to be at the very least five tooth modules. In addition, the use of unequal tooth whole depths would double the required hob inventory.

It may be noted that the gear teeth herein disclosed are particularly adapted to fabrication from nitrided steel. Since nitriding does not require a quench, it produces much less distortion than other forms of heat treating. Its utility for involute gearing is limited by the fact that the case it produces is not as thick as the depth at which the most serious surface stress occurs in larger gearing. In "standard-pitch gearing", however, the shortened radius of relative curvature of the profiles brings this most severely stressed element sufficiently closer to the tooth surface to fall within a nitrided case.

Several points may be noted in connection with the tooling for manufacture of standard-pitch gearing: The point of inflection 20 of the tooth profile curves should be at a point where the tangent to the profile makes an angle of at least 5° or 6° with a radial line. This is about the smallest angle that will allow sufficient hob clearance for easy machining and will also allow the hob to be of the sharpenable "constant profile" type.

So far as hob inventory is concerned, the possibilities the subject invention affords to standardizing on a small number gear tooth modules, as for example 0.5 and 0.8, should be taken advantage of wherever possible. Four or five hobs at each of these modules will be necessary for cutting different dedendum depths, but an inventory of 10 or at most 15 hobs will be sufficient to cut all gears of all sizes. In the involute system, on the other hand, the hob inventory needed for the same purpose may be two to three times as large, since hobs for involute pinions with small tooth numbers must usually be available in both right and left-hand forms.

A number of design features that help to reduce noise emission may be used with the gearing herein disclosed. For example, at least one of the mating pair (usually the larger gear) may be made of cast iron; a spoked web may be used in preference to a solid web; a layer of damping material such as plastic or rubber may be inserted between the rim and web of one or both gears or molded onto the end faces of one or both gears. If one of the gears is made of cast iron and the other of steel, the latter should have a much greater dedendum depth than the former so that the cast iron gear will not be overstressed in bending.

It should be noted that the term "pitch circle" as used in gear specifications may be defined in two ways:

1. Any pair of gears is operable over a certain range of center-distances prescribed by the minimum and maximum interengagement the teeth will allow. Changing the center-distance simply changes the tooth flank and rooth clearance, but the velocity ratio, which is governed by the number of teeth on each of the gears, is unaffected. To take account of this center-distance variability, the "pitch circles" of a pair of gears are sometimes defined as those circles that divide the center-distance in proportion to the velocity ratio, that is to say, the circles that have the same diameters as a pair of rollers that would afford the given velocity ratio when mounted at the given center-distance. To avoid confusion, it is probably best to call these the "working pitch circles" and to bear in mind that the diameters of these "working pitch circles" vary somewhat depending on the particular center-distance used, and this in turn produces minor variations in the pressure angle and addendum-dedendum proportions. 2. The "pitch circle" of a gear may also be defined in terms of the geometry of its teeth. For example, in the 20°-involute system, the "pitch circle" is most often construed as the circle that intersects the tooth profiles at a point where the tooth surface makes an angle of 20° with a radial line, and also divides the teeth into addendum and dedendum proportions having heights prescribed by established standards (AGMA, BS, DIN, etc.). In effect, this second definition establishes theoretically correct or optimum center-distance and tooth clearance for the given gear type, as well as pressure angle and addendum-dedendum porportions. (Note: This second definition should not be confused with "reference circle", which concerns the radial displacement of a gear relative to the hob used to make it.)

In order that the tooth pressure angle and the addendum-dedendum proportions have specific values and shall not be subject to variations produced by extended or overly-close center-distance mountings, the definition of "pitch circle" employed in this specification and the ensuing claims shall be construed as the second of these two definitions, rather than what has been called above the "working pitch circle".

In this specification and the ensuing claims a number of other terms are employed that may require definition. These are as follows: "Tooth flanks" means the portion of the surface of the tooth that lies between the pitch circle as defined above, and the tooth root; "transverse" means lying in a plane perpendicular to the common pitch element (i.e., the element common to the mating pitch surfaces); "pitch surface" means the cylindrical surface (or in the case of a bevel gear, the conical surface) that contains the pitch circles of all transverse planes; "whole depth" means the sum of the addendum and the dedendum of a tooth, measured in a direction perpendicular to the pitch surface; "tooth" means a projecting portion of a gear body, and does not include a pin of the type used in lantern gearing; "dedendum" is the portion of a tooth that lies between the pitch surface and the root surface, or if a slot is cut into the root to increase the tooth flexibility, the portion of the gear that lies between the pitch surface and the portion of the slot furthest removed from the pitch surface; "dedendum depth" is the extent of the dedendum as herein defined, measured in a direction perpendicular to the pitch surface; "critical stress" means the lowest stress that will produce permanent structural damage at any point in a tooth, comprising a yield point stress in a gear set subjected to peak torque loads greater than twice the continuous operating torque, and a fatigue stress in all other gear sets; "culmination surface" means the surface of revolution that contains all culmination points; "addendum circle" means the locus of the point on the working profile of a gear tooth furthest removed from the tooth root, when said gear turns about a fixed central axis; "working depth" means the maximum overlap distance between the addendum circles of a pair of mating gear tooth profiles, measured perpendicularly to the gear pitch surfaces at their line of tangency; "line of action" means a line in the transverse plane that contains the locus of the center of the contact area intersection with said plane, which line in the case of the gearing herein disclosed lengthens or shortens depending on how much torque is being transmitted, but cannot extend beyond the points where it intersects the addendum circles well outside the corresponding points for involute gears of the same size, gear ratio, tooth module, working depth and pressure angle.

I claim:

1. In a pair of mating gears,
teeth having working profiles in the transverse plane for which the radius of relative curvature at the pitch point is substantially smaller than the radius of relative curvature at the pitch point for involute gears of the same size and pressure angle, but greater than one and one-tenth tooth modules,
the whole depth of the teeth of one of said pair being greater than two and six-tenths tooth modules,
the tooth pitch angle in the transverse plane for neither of said pair being greater than 10°.

2. A pair of mating gears according to claim 1 wherein the thickness of the dedendum portion of the teeth of at least one of said pair increases with distance from the pitch surface.

3. A pair of mating gears according to claim 2 wherein a portion of the profiles of the dedenda of said teeth are substantially segments of an exponential curve.

4. A pair of mating gears according to claim 1 wherein said radius of relative curvature is smaller than 80 percent of that of said involute gears.

5. A pair of mating gears according to claim 1 wherein said teeth are slantingly disposed with respect to an element common to the pitch surfaces of said pair.

6. A pair of mating gears according to claim 5 wherein the working portions of said teeth in planes normal to the flanks of said teeth are substantially circular arcs.

7. A pair of mating gears according to claim 1 wherein said pitch angle for neither of said pair is greater than 8°.

8. A pair of mating gears according to claim 1 wherein the working portions of said teeth in the transverse plane are substantially circular arcs.

9. A pair of mating gears according to claim 1 wherein said teeth have dedendum depths and dedendum thicknesses giving substantially the amount of bending deflection at said pitch point that will make the tooth contact areas on one of said pair tangent to the addendum surface of the other of said pair when said pair is subjected to torque load that produces a critical stress, as herein before defined, at at least one point in said tooth.

10. A pair of mating gears according to claim 9 wherein said teeth have a tooth module, tooth profile radii, module of elasticity and a pressure angle that make the tooth surface stresses and root stresses become critical stresses, as hereinfore defined, at the same torque load.

11. A pair of mating gears according to claim 1 wherein the clearance between the tips of the teeth on one of said pair and the roots of the teeth of the other of said pair is greater than 0.4 tooth modules.

12. A pair of mating gears according to claim 1 wherein the tooth module is smaller than 1.3.

13. A pair of mating gears according to claim 1 wherein the dedendum depth of the teeth of one of said pair is greater than 1.6 tooth modules.

14. A pair of mating gears according to claim 1 wherein the sum of the addendum heights of the teeth of said pair is greater than two tooth modules.

15. A pair of mating gears according to claim 1 wherein the dedendum depth of the teeth of one of said pair added to that of the other of said pair gives a sum greater than three and two-tenths tooth modules.

16. A pair of mating gears according to claim 1 wherein said radius of relative curvature is smaller than 60% of that of said involute gears.

17. A pair of mating gears according to claim 1 wherein the pressure angle in planes normal to the tooth flanks at the pitch surface is smaller than 20°.

18. A pair of mating gears according to claim 1 wherein the active tooth surface of one of said pair comprises less than half its total tooth surface not including the addendum or root surfaces.

19. A pair of mating gears according to claim 1 wherein said pressure angle is smaller than 15°.

20. A pair of mating gears according to claim 1 wherein the whole depth of the teeth of one of said pair added to that of the other of said pair gives a sum greater than five tooth modules.

21. A pair of mating gears according to claim 20 wherein said sum is greater than five and one-half tooth modules.

22. A pair of mating gears according to claim 20 wherein said sum is greater than six tooth modules.

23. A pair of mating gears according to claim 1 wherein said radius of relative curvature of the teeth of said pair is larger than 1.25 tooth modules.

24. A pair of mating gears according to claim 1 wherein the teeth of one of said pair have a longer addendum than the teeth of the other of said pair.

25. A pair of mating gears according to claim 1 wherein the pressure angle for one of said pair at its pitch circle is larger than that of the other of said pair.

26. A pair of mating gears according to claim 1 wherein both of said pair have pitch circle diameters greater than fifteen millimeters.

27. A pair of mating gears according to claim 1 wherein the web of one of said pair is made of cast iron.

28. A pair of mating gears according to claim 1 wherein the dedendum depth of the teeth of one of said pair is greater than that of the teeth of the other of said pair.

29. A pair of mating gears according to claim 1 wherein said radius of relative curvature is smaller than 90 percent of that of said involute gears.

30. A pair of mating gears according to claim 1 wherein said whole depth is greater than two and three-quarters tooth modules.

31. A pair of mating gears according to claim 1 wherein said pitch angle for neither of said pair is greater than 6°.

* * * * *